Sept. 15, 1959        C. LISCIANI        2,904,352
COUPLING WITH REMOVABLY RETAINED PACKING
Filed Aug. 20, 1953
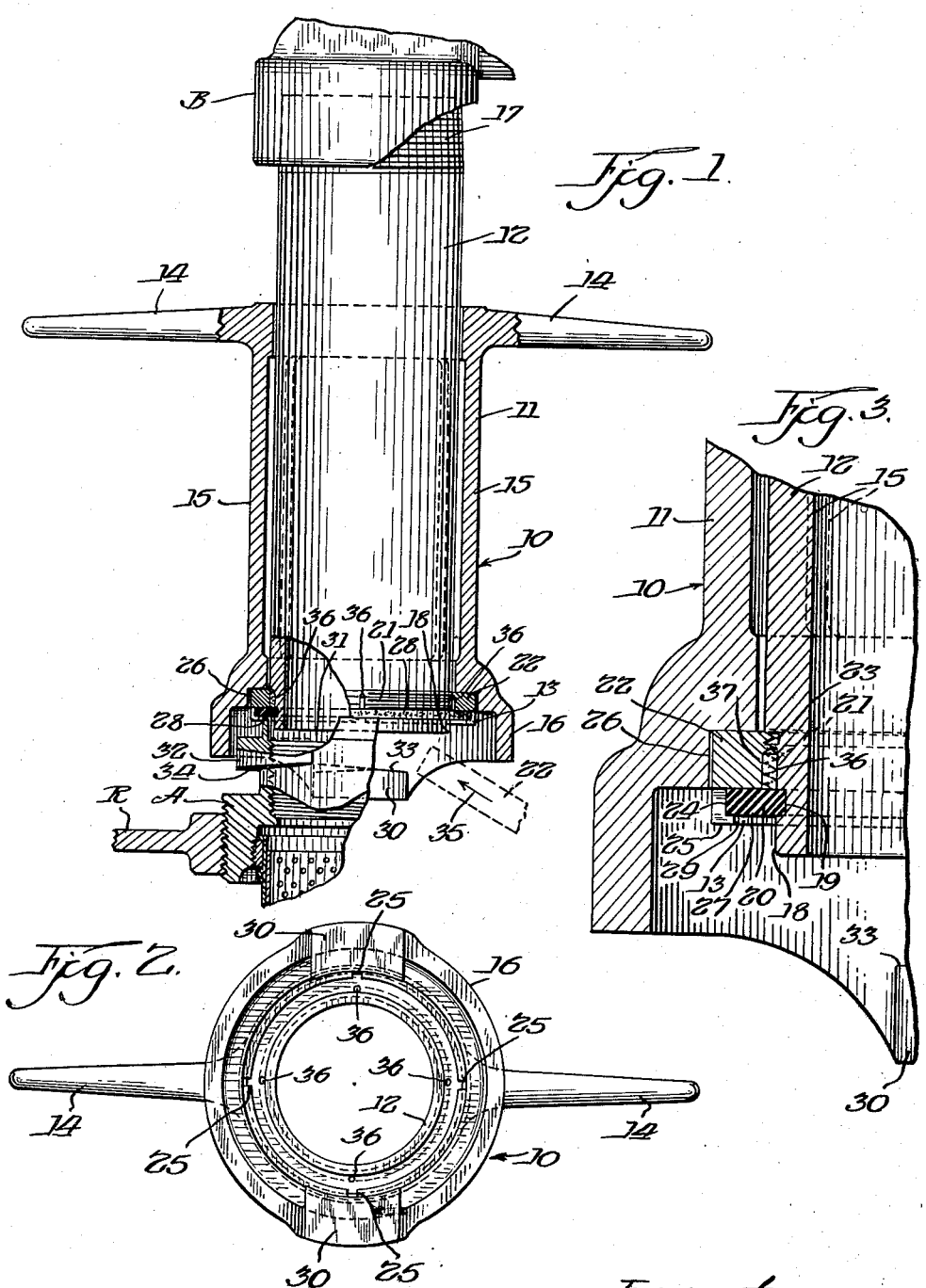
Inventor:
Constantine Lisciani,
By Stiee & Stiee Attys.

United States Patent Office 2,904,352
Patented Sept. 15, 1959

2,904,352

COUPLING WITH REMOVABLY RETAINED PACKING

Constantine Lisciani, Chicago, Ill., assignor to The Protectoseal Company, Chicago, Ill., a corporation of Illinois Application August 20, 1953, Serial No. 375,508

1 Claim. (Cl. 285—15)

This invention relates generally to a coupling structure and more particularly to a swivel coupling of the type used for fuel oil and water couplings on railroad systems, such as for filling fuel oil or water in the respective reservoirs of diesel locomotives.

Various makeshift devices have been used in railroad yards for filling the water and fuel reservoirs in which the reservoirs were originally equipped with an inlet opening having a lock-type filler cap which either screwed into the inlet opening or had a bayonet joint construction with a suitable seal for preventing leakage. The inlet opening was provided with a fire screen when used for the fuel reservoir and was also equipped with a pressure relief valve. The cover for the water inlet, however, did not require the fire screen or the pressure relief valve. In coupling a fuel or water hose to these inlet openings, the threaded cap was removed and a pipe threaded therein, and the pipe might even have handles welded thereon. The upper end of the pipe included a part of a conventional swivel pipe coupling to which was attached the other half of the conventional swivel pipe coupling, and this had attached thereto a pipe for connection to a hose end or valve nozzle. In order to speed the coupling of the parts together, arms were welded onto part of the swivel pipe coupling. Although this was satisfactory, it provided many additonal points of leakage and the servicing time was somewhat too long where it is necessary to service a diesel locomotive between stops in a very limited period.

Other forms of couplings, although satisfactory, have a tendency to place the sealing washer in shear with the result that there is excessive gasket replacement and leakage. Still other forms of couplings have the gasket affixed to the coupling member so that it rotates as the coupling is attached to the inlet opening which, in turn, tends to cause shearing and excessive wear of the gasket requiring extensive replacement in use to prevent leakage.

It is, therefore, a principal object of my invention to provide an improved form of coupling to reduce the time in servicing a locomotive and to also provide a coupling which may be readily installed and which requires a minimum of servicing with respect to gasket replacement.

The invention also has among its objects the production of a coupling to eliminate the use of tools in the servicing of locomotives of the diesel type and to eliminate the spillage and waste of such liquids in servicing.

Another object of the invention is to prevent the maintenance man from improperly filling liquids in the wrong reservoir therefor.

Another object of the invention is to provide a coupling which has a tight joint when used in servicing, and to provide a coupling for oil which has a special oil resistant gasket and also forms a tight seal when coupled.

Still another object of the invention is to provide a coupling with a tail section which has a smooth passage for oil or water or other liquids to be filled, and in which the tail section or pipe of the swivel coupling swivels freely inside the coupling head to allow the hose attached thereto to swivel freely without twisting or kicking.

Another object of the invention is to provide a swivel coupling having low gasket replacement cost, a coupling which has the lowest possible refueling time, and in which there is no threaded connection for leakage.

Still another object of the invention is to provide a swivel connection so that the filling hose need not be twisted in coupling and, therefore, cause the hose to uncouple.

In order to accomplish the objects of my invention, it is preferred to provide a swivel coupling having an outer housing formed from brass or other suitable material, and as an example, a material such as aluminum for certain installations, which provides the support for the handle for disconnecting the coupling without the use of tools. The housing is skeleton like in shape and provided at the opposite end of the handle with tapered lugs complementally formed to those on the inlet coupling of the reservoir. Mounted and swiveling within the outer housing is a swivel pipe coupling for connecting to a hose supplying the liquid to be serviced and which is provided with a novel seal construction for sealing the swivel pipe and to allow the pipe to swivel within the housing.

Many other objects and advantages of the construction herein shown and described will be obvious to those skilled in the art from the disclosure herein given.

To this end my invention consists in the novel construction, arrangement, and combination of parts herein shown and described, and more particularly pointed out in the claim.

In the drawings, wherein like reference characters indicate like or corresponding parts:

Fig. 1 is a side elevational view, partly in section, illustrating the swivel coupling of my invention connected to a hose and coupled to an inlet of a reservoir;

Fig. 2 is a bottom end view illustrating the coupling connection disconnected from the reservoir and with the gasket removed; and, Fig. 3 is an enlarged vertical sectional view illustrating the seal construction between the swivel pipe and the outer housing.

Referring to the drawings, there is illustrated a swivel coupling 10 comprising a swivel housing 11 and a swivel pipe 12. The swivel pipe at its inner end at the point it is coupled to the inlet opening A of the reservoir R is provided with an improved gasket construction 13.

It is preferred to fabricate the housing 11 from cast brass although it is within the scope of the invention that a suitable light weight housing structure may be formed by casting it from aluminum alloy and heat treated to withstand the rough handling in servicing locomotives. The upper end of the elongated housing is provided with laterally extending handles 14 shaped as illustrated in Fig. 1 for ease in manipulation, and of sufficient leverage for manually coupling the connection to the inlet of a fuel oil or water reservoir, and to disconnect it without the use of a hammer, to loosen or tighten the connection, so that the hose coupling may be readily attached.

The housing is preferably formed elongated, and in order to reduce the weight of the coupling has peripherally spaced ribs 15, two in number, and of sufficient strength to transmit the force supplied to the handles 14 to the coupling connection 16 to attach or detach the swivel coupling to the inlet connection A of the reservoir R. The coupling housing 11 is also of sufficient length to provide a support to the coupling pipe to prevent cocking of the pipe and damage to the seal. The relative overall size of a coupling of this character for a 2½-inch filling hose is approximately 8 3/16 inches in length of the housing and the inner diameter substantially 4¼ inches of the coupling connection 16. The overall length of the handles is substantially 10¼ inches from end to end. The overall length of the pipe is substantially 10½ inches with the pipe being standard 2½-inch iron pipe and, when assembled, the overall height of the coupling is substantially 11½ inches with substantially 3⅞₁₆ inches of the pipe extending beyond the upper end of the housing. The dimensions are given not as critical sizes but as illustrative of the relative size of a coupling of this type for a 2½-inch filling hose.

The coupling pipe 12 is threaded at its upper end at 17 with a 2½-inch straight pipe die to which the coupling or nozzle B of a fuel or water hose (not shown) is attached. The lower end is machined to substantially 2²⁵⁄₃₂ inches in diameter at 18, and formed with an annular groove 19 substantially 2²¹⁄₃₂ inches in diameter to receive a "Thiokol" gasket 20 manufactured by the Thiokol Corp., treated leather gasket, or other suitable commercial gasket known to the trade as "Hycar" which is a good grade of Buna "N" synthetic rubber, which are suitably resistant to various types of fuel with which the coupling may be used. When the coupling is used for water, a "neoprene" gasket, rubber, red rubber, or suitable synthetic rubber gasket may be used. The outer periphery of the pipe above the annular groove 19 is threaded at 21 with a 2⅞-inch diameter thread, sixteen threads per inch, to affix an annular collar 22 similarly threaded. An annular clearance groove 23 is formed on the pipe coupling to permit the collar to be tightly affixed to the pipe.

The collar 22 is formed with an annular recess 24, similar to the annular groove 19, to receive the outer peripheral edge of the gasket 20. The outer periphery of the collar is provided with slots 25, Figs. 2 and 3, to receive a spanner wrench or the like for coupling and uncoupling the collar 22 to the lower end of the pipe coupling. The collar 22 is formed to have running fit in a complementally formed counterbore 26 in the coupling connection 16. The overall diameter of the collar 22 is approximately 3¾ inches. The collar 22 and the lower end of the coupling pipe 12, which support the washer 20, provide an annular surface between the periphery of the lower end of the pipe and the annular recess 24 at 27, which seats upon the annular end 28 of the inlet member A. The annular grooves 19 and 24 prevent the gasket 20 from falling out as it expands with use by the absorption of the fluid, which is filled in the particular reservoir. The annular groove 24 is of such a depth that although the gasket is retained in place, the gasket may be simply removed by inserting a pointed tool within one of the slots 25 and picking the gasket out, which then may be replaced by first inserting the gasket in the inner recess 19 and then snapping or pressing it in the outer annular groove 24 past the slight lip 29. It is thus evident that the gasket may be readily removed and replaced when it is worn, and yet be retained in place during the period in use. It is also to be noted that the gasket is on what may be considered the stationary part of the swivel coupling so that the gasket is not placed in shear when assembled though there may perhaps be a very slight amount of shear, but not of any consequence as the coupling housing 11 is latched in place. When in place, the gasket is in compression upon the upper edge 28 of the inlet member A and between the collar 22 affixed to the relative stationary pipe section or tail section 12 of the coupling.

In order to clamp the coupling connection 16 to the inlet connection A, tapered key-shaped members 30 are integrally affixed or molded with the coupling end and complementally shaped to the openings 31 between the securing members 32 of the inlet coupling. The key-shaped members 30, which are diametrically formed, are provided with a 1° 56' taper at the surface 33, which is complementally formed to the taper of the securing member 32 and groove 34 of the inlet opening. In order to affix the coupling 10 to the inlet opening A, the members 30 are inserted within the opposite openings 31 and upon a slight clockwise movement, the coupling is firmly affixed in place and sealed. To open the coupling, a corresponding counterclockwise movement, until one edge of the member 30 abuts the member 32, indicating that the coupling may be removed by slight outward movement. It is, therefore, obvious that a simple coupling connection has been provided to quickly attach and detach the coupling to the inlet opening, which may be readily attached and detached in a minimum of time in the servicing of a locomotive with fuel oil, water, and other liquids, and in which an effective seal is provided between the members to prevent leakage of the liquids being serviced.

Although the swivel coupling has been described preferably for use with fuel oil, in order to prevent the improper connection of the fuel line to the water reservoir or the water line to the fuel reservoir, this is simply accomplished by changing the shape of the key-shaped members 30 and the complementally formed openings 31, and the overall height of the complementally formed key portions 32 and the tapered grooves 34. In this manner, even in poorly lighted conditions, one can connect the various couplings correctly.

The extended length of the swivel housing 11 and, likewise, the length of the pipe or tail section 12 is necessary in certain train constructions to provide sufficient clearance between the inlet openings of the various reservoirs mounted beneath the locomotive body or other appendages of a locomotive or car construction beneath which the reservoirs are mounted. With this increased length, it is possible to freely manually manipulate the handles 14 since the inlet openings are usually at an incline, and with a shorter length of housing the extended handles would interfere with the parts of the undercarriage of the train construction.

The construction of the coupling is such that the pipe coupling 12 and its associated collar 22 and gasket will not drop through the housing. The amount of movement between the upper position of the collar 22, which has a loose running fit between the collar periphery and the counterbore 26, is the distance between the lower edge of the collar and the upper edge 33 of the key-shaped member 30. The inner periphery of the collar at its lower end and of the key-shaped members 30 is substantially identical, so that the nominal position with the housing 11 vertical would be with the pipe coupling collar 22 resting upon the upper edge of the key-shaped members 30. Therefore, in order to assemble the collar 22 to its complementally threaded end after the threads 21 are well doped with litharge and glycerin, and similarly the complementally formed threads of the collar, the pipe 12 is inserted within the housing 11 with the coupling reversed end for end from that as shown in Fig. 1. The collar is then inserted at an angle from either side of the key-shaped members 30, as indicated by the arrow 35 and the dotted line of the collar 22. When the collar 22 is in position within the coupling connection 16 underneath the key-shaped members 33, the pipe is screwed in place, after which pins 36 are placed in the complementally drilled holes 37 along the periphery of the threaded joint between the collar 22 and the lower end of the pipe 12. After the pins 36 are in place, the ends of the opening are staked over to prevent the withdrawal of the pins. With the collar in position, the pipe 12 then cannot be removed and has only the limited movement between the lower end of the pipe and the upper end of the key-shaped members 30. The gasket 20 is then inserted in place as described above.

From the above disclosure, it is obvious that a simple coupling has been disclosed which may be readily attached to the inlet of a reservoir after the coupling has been suitably connected to a fuel or water line as desired. In servicing a locomotive, each fuel or water line is coupled to the threaded end 17 of its respective swivel coupling. In some instances, after the coupling has been connected to the opening, the fuel or water is turned on through a valve located at some distance. Usually, however, the swivel coupling 10 is coupled to the valved nozzle B.

In order to couple a service line to an inlet opening of a fuel or water reservoir, the inlet closure is usually unscrewed or uncoupled from the inlet opening by use of the wing-shaped handles of the closure (not shown). These are readily removed although if additional pressure is necessary, a slight tap is all that is necessary. The coupling 10 is then attached to the complementally formed bayonet construction of the inlet opening A as described above. With a slight clockwise turn of the handles 14, the coupling is firmly affixed and sealed in place. The liquid being serviced then may be turned on through the valve nozzle operatively connected to the coupling. The liquid is filled to a predetermined height, as determined by a gauge, and any air within the tank as the tank is filled is bled off through a suitable vent opening on the reservoir. When the liquid has reached a predetermined level, the valve within the line is shut off and with a quick tap in a counterclockwise direction on the handle 14, the coupling is detached. With these forms of couplings, a locomotive may be very rapidly serviced without the attendant leaks from the usual forms of couplings having many threaded joints, and the coupling is of such rigid construction that as it is dropped alongside of the track, there is no damage. Likewise, when attaching the coupling, since the hose connected to the pipe is of relatively large diameter, namely, nominal 2½-inch hose, the pipe coupling may be considered as being the stationary member and the housing 11 as the movable member, so that when in clamping, since the gasket is affixed to the pipe there is relatively very little shearing of the gasket, and when firmly affixed in place, the gasket is always under compression to effectively seal the opening. When filling, there is a clear passage through the pipe, which is unobstructed by any parts of the coupling or of the inlet opening in filling.

Although the coupling construction has been preferably described as being formed from cast brass with the pipe coupling of standard black iron pipe, the pipe is usually cadmium plated along with the collar which is preferably formed from 2¾-inch inside diameter steel tubing machined in the manner described. The parts thereof may be formed from suitable aluminum tubing and cast aluminum, though it has been found where the service is rather given to hard usage by dropping of the coupling that the formation of the parts of steel and cast brass give a coupling which will give longer service under the hard usage of this servicing operation. It is to be understood, however, that the parts may be suitably fabricated from any of the well-known materials for the particular usage intended. Although the device has been described for use with servicing of diesel locomotives, couplings of this invention may be suitably used for servicing of other liquids for tank car usage or military usage in which collapsible mobile tanks are provided with the inlet opening of this disclosure and the filling hoses are equipped with the swivel connections of this type. When used in this manner, gasoline tanks and the like required in servicing of military vehicles may be rapidly filled during landings and in advancing.

While I have illustrated the coupling as including a bayonet type joint including a cam locking device, it is also equally obvious that the coupling may be provided with a suitable threaded connection, when desired, for coupling to an inlet opening suitably threaded depending upon the particular application of the invention. It will be apparent from the above disclosure that I have provided a swivel coupling which is relatively simple in construction, attractive in appearance, and very efficient in use in servicing locomotives.

What I claim as new and desire to secure by Letters Patent is:

A pipe coupling comprising an inlet member having an annular upwardly extending flange having an upper annular sealing edge, a pipe member having a lower end portion adapted to telescope in said flange, said pipe member having an outwardly facing annular groove substantially rectangular in cross-section immediately above said end portion, a support ring removably affixed on said pipe member with a downwardly facing surface aligned with and forming substantially an extension of the upper surface of said groove, said support ring extending radially outwardly of said pipe member, a substantially annular downwardly and then inwardly extending flange integral with the outer portion of said support ring and adapted to telescopically receive said first-mentioned flange and forming an inwardly facing groove opposite said first-mentioned groove, a substantially rectangular resilient gasket filling and extending between said grooves and adapted to be engaged by said sealing edge, at least one narrow slot through said downwardly and inwardly extending flange for reception of a gasket removing tool, and means rotatably mounted on said pipe member and engageable with said support member and inlet member for drawing said pipe member and inlet member axially together to hold said sealing edge in sealing engagement with said gasket.

References Cited in the file of this patent

UNITED STATES PATENTS

| 110,114 | Conner | Dec. 13, 1870 |
| 442,947 | Bowers | Dec. 16, 1890 |
| 704,792 | Gold | July 15, 1902 |
| 894,594 | Cani | July 28, 1908 |
| 1,572,355 | Grote | Feb. 9, 1926 |
| 1,830,973 | Wheaton | Nov. 10, 1931 |
| 1,850,860 | Albertine | Mar. 22, 1932 |
| 1,853,411 | Gentry et al. | Apr. 12, 1932 |
| 1,857,420 | Wolford | May 10, 1932 |
| 1,994,007 | Tallant et al. | Mar. 12, 1935 |
| 2,119,651 | Schierenbeck | June 7, 1938 |
| 2,128,474 | Rice | Aug. 30, 1938 |
| 2,268,407 | Krone et al. | Dec. 30, 1941 |
| 2,590,565 | Osborn | Mar. 25, 1952 |
| 2,663,581 | Grise et al. | Dec. 22, 1953 |

FOREIGN PATENTS

| 28,743 | Great Britain | Dec. 29, 1904 |
| 456,875 | Great Britain | Nov. 17, 1936 |